(No Model.)

S. T. NEIL.
COTTON CHOPPING MACHINE.

No. 550,327. Patented Nov. 26, 1895.

Witnesses,
C. E. Ard.
S. K. Cole

Inventor,
S. T. Neil.

By His Attorney,
J Snoow

UNITED STATES PATENT OFFICE.

SAM THOMAS NEIL, OF ATLANTA, GEORGIA, ASSIGNOR OF ONE-HALF TO J. A. SPAIN, OF SAME PLACE.

COTTON-CHOPPING MACHINE.

SPECIFICATION forming part of Letters Patent No. 550,327, dated November 26, 1895.

Application filed February 23, 1895. Serial No. 539,453. (No model.)

*To all whom it may concern:*

Be it known that I, SAM THOMAS NEIL, a citizen of the United States, residing at Atlanta, in the county of Fulton, State of Georgia, have invented a new and useful Improvement in Cotton-Chopping Machines, of which the following is a specification.

My invention relates to improvements in cotton-chopping machines; and it consists of a suitable axle and wheels, to which are attached beveled wheels, which operate the shafts upon which the chopping-hoes are mounted, all of which will be fully described hereinafter.

Figure 1:
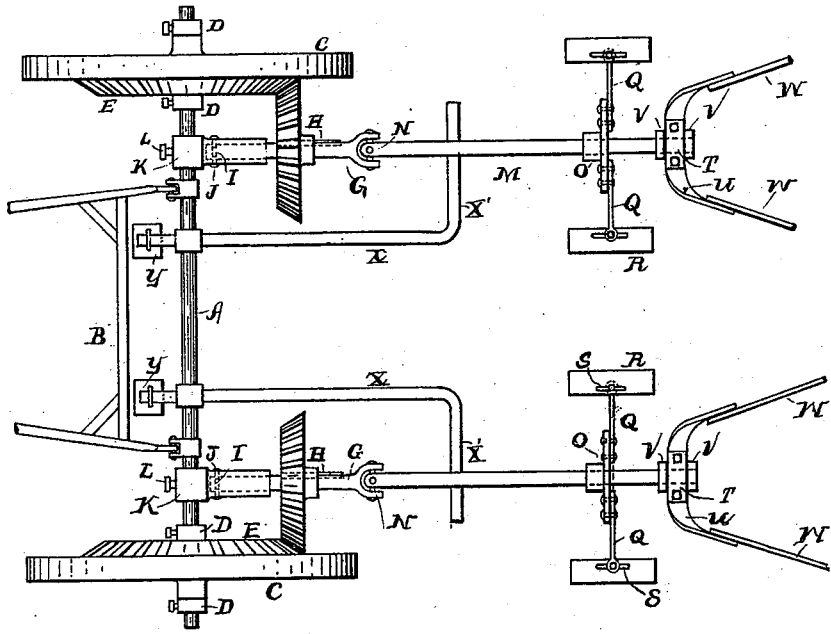
Figures 2, 3, 4:
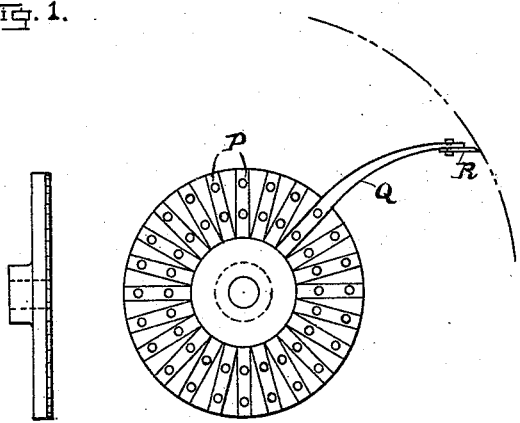

In the accompanying drawings, Figure 1 is a top plan view of a mechanism which embodies my invention. Fig. 2 is an edge view of the hoe-disk, and Fig. 3 is a face or side view of same. Fig. 4 is a view of a special hoe, to be used as hereinafter stated.

A represents the axle which supports the machinery and to which the shafts B are attached. The shafts may be made for a double or single team, as may be desired.

On each end of the axle there is an agricultural wheel C. These wheels revolve freely on the axle and are prevented from moving longitudinally on the axle by means of the set-collars D. To each of the wheels there is secured a beveled gear E. The beveled gear-wheels E and F mesh. The beveled gear-wheel is made to revolve with the shaft G, when desired, by means of the feather H.

When the machine is in operation, the beveled gear-wheel is held in place with a set-screw through the hub and on the feather to prevent the beveled pinion moving longitudinally on the shaft. When not in use, as when moving the machine back and forth from the field, the set-screw on the feather is loosened, and the beveled gear-wheel can then slip on the shaft G and out of gear with the larger beveled wheel. One end of the shaft G has an annular groove I cut in it, and by means of the pin J, projecting through the bearing into this groove, the shaft is held in the bearing K, yet it can freely revolve. The bearing K is secured to the axle with a set-screw L.

The hoe-shaft M is connected to the shaft G with a universal coupling N, and the hoe-disk O (shown in Figs. 2 and 3) is secured to the shaft M with a set-screw. The disk contains a number of radial slots P on its face in which the hoe-arms Q are bolted. On the end of each hoe-arm there is secured by means of a bolt a hoe R. These hoes each contain an elongated hole S for the bolt to pass through. The elongated hole admits of a longitudinal adjustment to the hoe. The hoe-shaft M works freely in the handle-bar bearing T, the handle-bar U being held on the shaft by the set-collars V placed on each side. The short plow-handles W are bolted to the handle-bar. The bent lever X is loosely pivoted on the axle, and the arm X' is directly under the hoe-shaft M. The other end of the bent lever X supports a weight Y sufficient to balance the weight of the hoe-shaft and its attachments, the object being to relieve the operator of all weight when using the machine.

In operating the machine the necessary adjustments are made to suit the width of the cotton-rows by loosening the set-collars D and bearings K. Then the wheels and bearings may be moved along the axle to the desired width. As many hoes can be placed on the disk as needed, it being obvious that the greater the number of hoes used the fewer cotton-plants will be left standing. To get a uniform stand of cotton-plants it is necessary to place the hoes equidistant around the disk. The adjustments being properly made, the operator holds the handles W, and as the machine is pulled along the cotton-row he presses down on the handles to bring the revolving hoes in contact with the ground as often as necessary. Where there are no cotton-plants or a thin stand, the hoes are held clear of the ground by means of the counterweight Y. If the cotton is thickly planted, the hoes are pressed to the ground as often as is necessary for the revolving hoes to leave the required stand of cotton-plants.

The machine shown in the drawings is a double machine and is to be operated by two persons and will chop two rows simultaneously. Should any obstruction be found in the row, as a stump, the universal joint between the shaft G and the hoe-shaft M will enable the operator to get his hoes either over or around it without driving the team around. The universal joint also enables the operator to chop out cotton on a hillside and in any row, however crooked it may be. The force of the blow that is struck by the hoes being entirely mechanical, the operator simply decides where to bring a hoe into action and does so by pressing downward on the handles. Should the cotton be excessively thick or a crust form over the plants sufficient to prevent them coming through the ground, the pronged hoe shown in Fig. 4 can be used to break the crust or thin out the thick cotton-plants before using the regular chopping-hoes. The pronged hoes are secured to the hoe-arms the same as are the chopping-hoes.

Having thus described my invention, what I claim as new, and desire to secure by Letters Patent of the United States, is—

1. In a cotton chopper, the combination with a suitable axle, of the longitudinally adjustable wheels loosely mounted thereon and held in place with set collars, the adjustable beveled gear bearing, the shaft adapted to turn freely in the bearing but held from slipping out by means of the pin and groove in the end thereof, a feather fitted in the gear shaft, the gear wheel adapted to revolve the shaft, the hoe disk adjustable along said shaft and secured thereto, the handle bar loosely mounted thereon and having plow handles secured thereto, substantially as specified.

2. In a cotton chopper, the combination with a suitable axle, of the longitudinally adjustable wheels loosely mounted thereon, the adjustable gear bearing, the shaft adapted to turn freely in the bearing, the gear-wheel adapted to revolve the shaft and to slide freely on the feather, the hoe shaft, the disk, hoe arms bolted thereto, each adapted to receive and hold a hoe, the counterbalanced pivotal lever adapted to sustain the weight of the hoe shaft and its attachments and the universal connection between hoe shaft and pinion shaft, substantially as herein described.

SAM THOMAS NEIL.

Witnesses:
H. C. NEWTON,
WALKER DUNSON.